(12) United States Patent
Xiao et al.

(10) Patent No.: US 7,867,939 B2
(45) Date of Patent: Jan. 11, 2011

(54) CATALYST FOR ETHYLENE POLYMERIZATION, PREPARATION THEREOF, AND METHOD FOR CONTROLLING THE POLYMERIZATION KINETIC BEHAVIOR OF SAID CATALYST

(75) Inventors: Mingwei Xiao, Shanghai (CN); Shijiong Yu, Shanghai (CN); Xiaofeng Ye, Shanghai (CN)

(73) Assignees: China Petroleum & Chemical Corporation, Beijing (CN); Shanghai Research Institute of Chemical Industry, Shanghai (CN)

( * ) Notice: Subject to any disclaimer, the term of this patent is extended or adjusted under 35 U.S.C. 154(b) by 942 days.

(21) Appl. No.: 11/630,207

(22) PCT Filed: Jun. 24, 2005

(86) PCT No.: PCT/CN2005/000920

§ 371 (c)(1),
(2), (4) Date: Apr. 13, 2007

(87) PCT Pub. No.: WO2006/000162

PCT Pub. Date: Jan. 5, 2006

(65) Prior Publication Data

US 2008/0027191 A1    Jan. 31, 2008

(30) Foreign Application Priority Data

Jun. 24, 2004    (CN) ........................ 2004 1 0025436

(51) Int. Cl.
*B01J 31/32*    (2006.01)
*C08F 4/02*    (2006.01)

(52) U.S. Cl. ........................ 502/115; 502/103; 502/113; 502/104; 502/125; 526/144; 526/124.2; 526/124.3; 526/352

(58) Field of Classification Search ................. 502/103, 502/113, 115, 104, 125; 526/144, 124.2, 526/124.3, 352
See application file for complete search history.

(56) References Cited

U.S. PATENT DOCUMENTS

| 4,330,647 | A |   | 5/1982  | Sakurai et al.              |
|-----------|---|---|---------|-----------------------------|
| 4,374,753 | A | * | 2/1983  | Pullukat et al. ..... 502/111 |
| 5,589,555 | A |   | 12/1996 | Zboril et al.               |
| 6,723,677 | B1| * | 4/2004  | Estrada et al. ..... 502/119 |

FOREIGN PATENT DOCUMENTS

| CN | 1235169 A | 11/1999 |
| CN | 1297458 A | 5/2001  |

* cited by examiner

*Primary Examiner*—Ling-Siu Choi
(74) *Attorney, Agent, or Firm*—Birch, Stewart, Kolasch & Birch, LLP (57) ABSTRACT

The present invention relates to a catalyst for polymerization of ethylene, a process for preparing the same, and a method for controlling kinetic behavior of said catalyst in ethylene polymerization. Said catalyst contains a titanium-containing main catalyst component and a co-catalyst. The titanium-containing main catalyst component is prepared by reacting the following components: (1) a hydrocarbon solution of dialkylmagnesium compound of formula $RMgR'\cdot yEt_3Al$; (2) an alcohol compound of formula $R^1OH$; (3) a silica support thermally activated at 200-800° C.; (4) an alkylaluminum compound of formula $R^2{}_n AlCl_{3-n}$; (5) a linear halogenated alkane of formula $R^3X$; and (6) a titanium compound of formula $Ti(OR^4)_m Cl_{4-m}$. The co-catalyst is an organoaluminum compound. Three different types of ethylene polymerization kinetic curves can be obtained by adjusting the temperature for thermally activating the silica support and the ratio of titanium to magnesium in the titanium-containing main catalyst component.

20 Claims, 4 Drawing Sheets

CATALYST FOR ETHYLENE POLYMERIZATION, PREPARATION THEREOF, AND METHOD FOR CONTROLLING THE POLYMERIZATION KINETIC BEHAVIOR OF SAID CATALYST

CROSS REFERENCE TO RELATED APPLICATIONS

The present application claims priority CN200410025436.2, filed on Jun. 24, 2004, which is incorporated herein by reference in its entirety and for all purposes.

TECHNICAL FIELD

The present invention relates to a catalyst for ethylene polymerization, a process for preparing the same, and a method for controlling the polymerization kinetic behavior of said catalyst.

BACKGROUND ART

Ziegler-Natta catalyst system, which is comprised of a compound of Groups IV-VI transition metals of the Periodic Table as main catalyst and a compound of Groups I-III metals of the Periodic Table as co-catalyst, is wildly used in the polymerization of olefinic unsaturated monomers. The reaction mechanism and polymerization kinetics of Ziegler-Natta catalyst are recognized by scientists in the world. When Ziegler-Natta catalyst is used in the polymerization of ethylene, different polymerization processes require different polymerization kinetic behaviors of the catalyst, and the studies on polymerization kinetic behavior of the catalyst are therefore indispensable. In general, polymerization kinetic curve is used to characterize the kinetic behavior of a catalyst. Typical polymerization kinetic curves suitable for industrial production include: (1) slowly rising and slowly falling type; (2) quickly rising and damping type; (3) quickly rising and stable type; etc.

In a conventional gas-phase fluidized bed polymerization process, the removal of reaction heat is difficult and polymerization residence time is relatively long, so that a catalyst having a slowly rising and slowly falling type polymerization kinetic curve is suitable for this process. In a gas-phase fluidized bed polymerization process operated under condensing mode (CM), the ability of removing heat is greatly enhanced so that the production capacity increases, and the polymerization residence time is shorten to half of that of the conventional process. In such a process, a catalyst having a quickly rising and damping type polymerization kinetic curve is desired, because it can exhibit a relatively high activity in a short residence time and can therefore meet the technical requirements. In a slurry polymerization process, reaction heat can be sufficiently removed, and residence time is relatively long, so that a catalyst having a quickly rising and slowly falling type polymerization kinetic curve can be employed.

In CN1265609A, Mobil discloses a catalyst composition for the production of homopolymer and copolymer of ethylene, said catalyst composition comprising a procatalyst and a trialkylaluminum as co-catalyst, wherein said procatalyst comprises the following components; i) silica which is calcined at a temperature of at least 600° C.; ii) a dialkylmagnesium compound $R_mMgR'_n$; iii) a tetraalkyl orthosilicate; and iv) titanium tetrachloride, wherein the molar ratio of Ti/Mg is in a range of from 0.7 to 1.4. Said catalyst exhibits a relatively high activity in the polymerization of ethylene, and melt flow ratio (MFR) of the resulting polymer can be adjusted by altering the temperature for calcining the silica so that ethylene/1-hexene copolymers having different molecular weight can be obtained.

In CN1246808A, Mobil discloses a supported catalyst composition for the polymerization of α-olefin, said catalyst composition being prepared by a process comprising: impregnating an inorganic support having hydroxyl groups with a compound RMgR' to form an intermediate; treating the intermediate with a halogen-containing reagent selected from tetrachloromethane and trichloroethane; contacting and reacting the treated intermediate with $TiCl_4$ to form a procatalyst having a ratio of Mg to Ti of 0.5-2; and combining said procatalyst and a dialkylaluminum halide compound to form an α-olefin polymerization catalyst. Said halogen-containing reagent can effectively improve the activity of said catalyst. Said catalyst can be used in the polymerization or copolymerization of ethylene to produce a polymer with multimodal molecular weight distribution in a single reactor.

In CN1038754C, BP discloses a Ziegler-Natta catalyst with granular support and a process for preparing the same, said process comprising contacting and reacting a granular support with an organosilicone compound, such as diethoxydimethylsilane, a dialkylmagnesium or optionally a trialkylaluminum, a monochloro-organic compound, and at least one quadrivalent titanium compound. The obtained catalyst has a relatively high catalytic activity, and the polymer particles have better morphology, are of spherical shape or like-sphere shape, and have a bulk density of 0.37-0.50 g/cm³.

In EP0688794A, Borealis discloses an ethylene polymerization catalyst exhibiting a high activity and a better activity balance, i.e. exhibiting a balanced activity in the production of a high molecular weight polymer (having a low melt index) and a low molecular weight polymer (having a high melt index). Said catalyst is prepared by reacting an inorganic support, an alkyl metal chloride supported on said support, a magnesium compound, and a titanium halide, wherein the magnesium compound is obtained by reacting a dialkylmagnesium containing same or different alkyl groups with a mono-alcohol bearing a branched chain.

The catalysts as disclosed in the above documents are derived from dialkylmagnesium as starting raw material, and have different characteristics, such as high polymerization activity, balanced high polymerization activity, better particle morphology of the resultant polymers, and adjustable molecular weight distribution of the resultant polymers. However, these documents do not disclose or suggest that the kinetic behavior of said catalysts in ethylene polymerization can be controlled by altering the conditions for preparation of said catalyst.

SUMMARY OF THE INVENTION

One object of the present invention is to provide a novel catalyst for the polymerization of ethylene. Said catalyst has balanced high polymerization activity and good copolymerization ability, and is sensitive to hydrogen regulation, and a polymer with high apparent density can be obtained. Furthermore, kinetic behavior of said catalyst in ethylene polymerization can be readily controlled by adjusting the proportions of key components of said catalyst or adjusting the conditions for preparation of said catalyst.

Another object of the present invention is to provide a process for preparing the catalyst of the invention.

Still another object of the present invention is to provide a method for controlling the kinetic behavior of the catalyst of the invention in polymerization.

DETAILED DESCRIPTION OF THE INVENTION

In an aspect, the present invention provides a catalyst for the polymerization of ethylene, consisting of component A and component B, wherein the component A is the main catalyst component and is prepared by contacting and reacting the following components:

(1) a hydrocarbon solution of dialkylmagnesium compound, wherein the dialkylmagnesium compound is represented by a formula of $RMgR'\cdot yEt_3Al$, wherein R and R' are identical or different, and are alkyl group having from 4 to 8 carbon atoms, y represents the molar ratio of $Et_3Al$ to RMgR' and has a value of from 0.125 to 0.5;

(2) an alcohol compound of formula $R^1OH$, wherein $R^1$ is an alkyl group having from 2 to 10 carbon atoms;

(3) an activated silica support, which can be, for example, thermally activated at a temperature of from 200 to 800° C.;

(4) an alkylaluminum compound of formula $R^2_nAlCl_{3-n}$, wherein $R^2$ is an alkyl having from 1 to 14 carbon atoms, and n is a number of from 1 to 3;

(5) a linear halogenated alkane of formula $R^3X$, wherein $R^3$ is a linear alkyl group having from 3 to 12 carbon atoms, and X is halogen;

(6) a titanium compound of formula $Ti(OR^4)_mCl_{4-m}$, in which $R^4$ is an alkyl group having from 1 to 10 carbon atoms, and m is a number of from 0 to 4;

said component B is co-catalyst, and is an organoaluminum compound.

In an embodiment, the molar ratio of said component B and said component A, expressed as molar ratio of Al in the component B to Ti in the component A, is in a range of from 30:1 to 300:1.

The component A of said catalyst is another subject matter of the present invention.

A solution of dialkylmagnesium compound ($RMgR'\cdot yEt_3Al$) in hydrocarbon is used in the preparation of the component A of the catalyst of the present invention, wherein R and R' represent identical or different alkyl group having from 4 to 8 carbon atoms. For example, said solution can be a homogenous solution formed by dissolving a complex of dibutylmagnesium, dihexylmagnesium, butylhexylmagnesium, butyloctylmagnesium, etc., preferably dibutylmagnesium, with triethylaluminum $Et_3Al$ in a certain ratio (y) in a hydrocarbon solvent. In the present invention, the molar ratio y is controlled between 0.125 and 0.5 by adjusting the amount of the added triethylaluminum. The process for preparing said solution is well known in the art (see, for example, Malpass D. B., Franin L. W., J. Organometal Chem., 1975, 93, 1). The hydrocarbon used can be an aliphatic hydrocarbon compound containing 5 to 10 carbon atoms, such as n-pentane, iso-pentane, n-hexane, n-heptane, n-octane, etc., preferably n-hexane and n-heptane.

In the preparation of the component A of the catalyst of the present invention, an alcohol compound $R^1OH$, in which $R^1$ is an alkyl group having from 2 to 10 carbon atoms, preferably an alkyl having from 4 to 8 carbon atoms, such as iso-butanol, 2-ethylhexanol, 2-methylpentanol, 2-ethylbutanol, octanol, etc. is used.

In the preparation of the component A of the catalyst of the present invention, a silica having a particle size ranging from 5 to 250 μm, preferably from 10 to 90 μm, and a surface area of at least 3 $m^2/g$, preferably from 30 to 500 $m^2/g$ is used. Commercially available product, such as Crosfield ES70X, Grace Davison 955, Grace Davison 948, etc. can be used.

In the preparation of the component A of the catalyst of the present invention, organoaluminum compound of formula $R^2_nAlCl_{3-n}$, in which $R^2$ is an alkyl having from 1 to 14 carbon atoms, and n is a number of from 1 to 3, is used. The organoaluminum compound can be selected from the group consisting of triethylaluminum, triisopropylaluminum, triisobutylaluminum, tri(n-octyl)aluminum, tri(2-ethylhexyl)aluminum, diethylaluminum chloride, ethylaluminum dichloride, diisopropylaluminum chloride, ethylaluminum sesquichloride, butylaluminum sesquichloride, and mixtures thereof.

In the preparation of the component A of the catalyst of the present invention, linear halogenated alkane of formula $R^3X$, in which $R^3$ is a linear alkyl group having from 3 to 12 carbon atoms, preferably a linear alkyl group having from 4 to 8 carbon atoms, and X is halogen, preferably chlorine, is used. The halogenated alkane can be selected from the group consisting of n-butyl chloride, n-pentyl chloride, n-hexyl chloride, n-heptyl chloride, n-octyl chloride, and mixtures thereof.

In the preparation of the component A of the catalyst of the present invention, titanium compound of formula $Ti(OR^4)_mCl_{4-m}$, in which $R^4$ is an alkyl group having from 1 to 10 carbon atoms, preferably an alkyl group having from 1 to 4 carbon atoms, and m is a number of from 0 to 4, is used. Said titanium compound can be one selected from the group consisting of titanium tetrachloride, tetra-n-butyl titanate, tetra-iso-propyl titanate, methoxytitanium trichloride, butoxytitanium trichloride, dibutoxytitanium dichloride, tributoxytitanium chloride. In the practice of the invention, a mixture of two different titanium compounds, for example, a mixture of titanium tetrachloride and a titanium compound containing at least one OR group can also be used. Preferably, a single titanium compound is used, and more preferably, titanium tetrachloride is used. The titanium compound can be used in such an amount that the molar ratio of Ti in the titanium compound to Mg in said dialkylmagnesium compound is in a range of from 0.2:1 to 1:1.

The organoaluminum compound as the component B of the catalyst of the present invention can be selected from the group consisting of triethylaluminum, diethylaluminum chloride, triisobutylaluminum, tri(n-hexyl)aluminum, and mixtures thereof, with triethylaluminum being preferred.

In another aspect, the present invention provides a process for preparing the component A of the catalyst for ethylene polymerization, comprising the steps of:

(1) impregnating an activated silica support, for example one activated thermally at 200-800° C., with a hydrocarbon solution of the dialkylmagnesium compound $RMgR'\cdot yEt_3Al$, in which R and R' are identical or different alkyl group having from 4 to 8 carbon atoms, and y is the molar ratio of $Et_3Al$ to RMgR' and has a value between 0.125 and 0.5, to form a slurry, wherein said dialkylmagnesium compound is used in an amount of from 0.5 to 5.0 mmolMg/g$SiO_2$;

(2) adding an alcohol compound $R^1OH$, in which $R^1$ is an alkyl group having from 2 to 10 carbon atoms, into the slurry obtained in step (1), and allowing them to react, wherein said alcohol compound is used in such an amount that the molar ratio of $R^1OH$ to the Mg in the dialkylmagnesium compound is in a range of from 1.7:1 to 4.0:1;

(3) adding alkylaluminum compound of formula $R^2_nAlCl_{3-n}$, in which $R^2$ is an alkyl group having from 1 to 14 carbon atoms, and n is a number of from 1 to 3, and a linear halogenated alkane of formula $R^3X$, in which $R^3$ is a linear alkyl group having from 3 to 12 carbon atoms, and X is halogen, into the slurry obtained in step (2), and allowing them to react, wherein said alkylaluminum compound is used in such an amount that the molar ratio of the Al in compound $R^2_nAlCl_{3-n}$ to Mg in the dialkylmagnesium compound is in a range of from 0.1:1 to 0.5:1, and said linear halogenated alkane $R^3X$ is used in such an amount that the molar ratio of compound $R^3X$ to the Mg in the dialkylmagnesium compound is in a range of from 1.8:1 to 6.0:1; and (4) adding a titanium compound of formula $Ti(OR^4)_mCl_{4-m}$, in which $R^4$ is an alkyl group having from 1 to 10 carbon atoms, and m is a number of from 0 to 4, into the slurry formed in step (3), allowing them to react, and then drying to give a solid main catalyst component, wherein said titanium compound is used in such an amount that the molar ratio of the titanium in compound $Ti(OR^4)_mCl_{4-m}$ to the Mg in the dialkylmagnesium compound is in a range of from 0.2:1 to 1:1.

The present invention further provides a process for preparing a catalyst for ethylene polymerization, comprising contacting said main catalyst component with a co-catalyst to form a catalyst for ethylene polymerization, wherein said co-catalyst is an organoaluminum compound, and the molar ratio of said co-catalyst, calculated on Al basis, to said main catalyst component, calculated on Ti basis, can be in a range of from 30:1 to 300:1.

In the present invention, silica is used as the support of the main catalyst component. In an embodiment, said support is thermally activated at an elevated temperature before it is used, so that physically absorbed water and surface hydroxy groups are removed. In the practice of the present invention, said support can be activated at a temperature of from 200 to 800° C., preferably from 400 to 700° C. It is preferred to activate thermally the silica in fluidized state by placing the silica in a fluidized bed and feeding nitrogen gas. Activation treatment can be carried out for 4 to 20 hours.

In an embodiment, the thermally treated silica may form a slurry in a hydrocarbon solvent, and then reacts with a hydrocarbon solution of the dialkylmagnesium compound $RMgR'·yEt_3Al$, wherein the amount of said dialkylmagnesium compound ranges from 0.5 to 5.0 mmolMg/gSiO$_2$, preferably from 1.0 to 3.0 mmolMg/gSiO$_2$. The hydrocarbon solution of dialkylmagnesium compound may be added in one batch. Of course, adding the hydrocarbon solution of dialkylmagnesium compound batchwise or dropwise is contemplated. Upon the completion of the addition, the resulting slurry is stirred at a temperature of from 20 to 60° C., preferably from 30 to 50° C. for 1 to 6 hours, preferably 3 to 5 hours, to give a dialkylmagnesium compound supported silica support slurry.

Then, the alcohol compound $R^1OH$ is added dropwise to said slurry over a time of from 10 minutes to 2 hours. At the initial stage of the reaction when a great heat is released, the rate of adding said alcohol compound should be controlled so that the reaction temperature is not greater than 50° C., and if necessary, a cooling means can be employed. Upon the completion of the addition, the reaction is maintained at 30-45° C. for 2-10 hours, preferably 4-8 hours. The alcohol compound is used in such an amount that the molar ratio of $R^1OH$ to the Mg in the dialkylmagnesium compound is in a range of from 1.7:1 to 4.0:1, preferably from 1.8:1 to 3.3:1. It is believed that the alcohol compound will react with both $RMgR'$ and $Et_3Al$ in the dialkylmagnesium compound $RMgR'·yEt_3Al$ supported on the silica, to form a complex that contains Mg, Al, alkyl R and alkoxy $OR^1$ and is uniformly distributed on the silica support.

At the end of the above reaction, the alkylaluminum compound of the formula $R^2_nAlCl_{3-n}$ and the linear halogenated alkane of the formula $R^3X$ are added to the slurry. The alkylaluminum compound and the linear halogenated alkane can be premixed for a time and then added in one batch, alternatively, the alkylaluminum compound and the linear halogenated alkane can be separately added in any order. After both of them are added, the reaction is preformed at 20-60° C., preferably 30-50° C., under stirring for 2-16 hours, preferably 4-10 hours. The alkylaluminum compound is used in such an amount that the molar ratio of the Al in the compound $R^2_nAlCl_{3-n}$ to Mg in the dialkylmagnesium compound is in a range of from 0.1:1 to 0.5:1, preferably from 0.15:1 to 0.40:1, and the linear halogenated alkane $R^3X$ is used in such an amount that the molar ratio of the compound $R^3X$ to the Mg in the dialkylmagnesium compound is in a range of from 1.8:1 to 6.0:1, preferably from 3.0:1 to 5.5:1. Herein, both the alkylaluminum compound and the linear halogenated alkane function as halogenating agent, and they should be used in combination, wherein the linear halogenated alkane is the main halogen source, while the alkylaluminum compound is a promoter for the halogenation reaction. The amount of the alkylaluminum compound is relatively small so that the subsequently added titanium compound will not be excessively reduced. The object of halogenation is to convert the magnesium compound in the reaction system into an active magnesium halide that can better act with the titanium compound.

Finally, the titanium of formula $Ti(OR^4)_mCl_{4-m}$ is added in such an amount that the molar ratio of the Ti in the compound $Ti(OR^4)_mCl_{4-m}$ to the Mg in the dialkylmagnesium compound is in a range of from 0.2:1 to 1:1, preferably from 0.25:1 to 0.90:1. The titanium compound can be added in one batch, or added dropwise over a time of from 10 minutes to 2 hours. The reaction is carried out at a temperature of from 20 to 80° C., preferably from 40 to 60° C. for 1 to 10 hours, preferably 3 to 8 hours. The solid main catalyst component is then obtained by drying.

The hydrocarbon solvent used in the aforesaid steps include aliphatic hydrocarbons, alicyclic hydrocarbons, and aromatic hydrocarbons, preferably aliphatic hydrocarbons having from 5 to 10 carbon atoms. Examples include n-pentane, iso-pentane, n-hexane, n-heptane, n-octane, etc., with n-hexane and n-heptane being preferred.

The catalyst for ethylene polymerization of the present invention is formed by contacting the main catalyst component with a co-catalyst, wherein the molar ratio of the co-catalyst, calculated on Al basis, to the main catalyst component, calculated on Ti basis, may be in a range of from 30:1 to 300:1, preferably from 50:1 to 250:1.

In the experiments for preparing the catalysts and for evaluating the polymerization performance of said catalysts, the inventors have found that catalysts exhibiting different polymerization kinetic behaviors can be obtained by simply adjusting the temperature for thermally activating the silica support and the amounts of magnesium compound and titanium compound for preparing the titanium-containing main catalyst component, without changing the types of key components of the catalysts. For the purpose of the present invention, polymerization kinetic curve is used to characterize the polymerization kinetic behavior of catalysts.

Thus, in another aspect, the present invention provides a method for controlling the polymerization kinetic behavior of catalyst by adjusting the temperature for thermally activating the silica support and the molar ratio of the titanium compound to the magnesium compound in the titanium containing main catalyst component, wherein the temperature for thermally activating silica ranges from 200 to 800° C., and the molar ratio of the Ti in the titanium compound $Ti(OR^4)_mCl_{4-m}$ and the Mg in the dialkylmagnesium compound is in a range of from 0.2:1 to 1:1.

When silica is thermally activated at a temperature of from 550-700° C., and the molar ratio of the Ti in the titanium compound to the Mg in the dialkylmagnesium compound in the main catalyst component is in a range of from 0.53:1 to 0.78:1, the kinetic behavior of the catalyst in ethylene polymerization is expressed as a quickly rising and damping type of kinetic curve.

When silica is thermally activated at a temperature of from 550-700° C., and the molar ratio of the Ti in the titanium compound to the Mg in the dialkylmagnesium compound in the main catalyst component is in a range of from 0.26:1 to 0.40:1, the kinetic behavior of the catalyst in ethylene polymerization is expressed as a quickly rising and stable type of kinetic curve.

When silica is thermally activated at a temperature of from 400-500° C., and the molar ratio of the Ti in the titanium compound to the Mg in the dialkylmagnesium compound in the main catalyst component is in a range of from 0.28:1 to 0.50:1, the kinetic behavior of the catalyst in ethylene polymerization is expressed as a slowly rising and slowly falling type of kinetic curve.

The ethylene polymerization catalyst of the present invention can be used in slurry and gas-phase polymerization processes for the production of polyethylene. If slurry polymerization process is employed, the polymerization temperature is 60-100° C., preferably 80-95° C.; if gas-phase polymerization process is employed, the polymerization temperature is 70-115° C., preferably 85-110° C.

The catalyst of the present invention can be used in the copolymerization of ethylene and an aliphatic α-olefin having from 3 to 8 carbon atoms. The suitable α-olefins include propylene, 1-butene, 1-pentene, 1-hexene, 4-methyl-1-pentene, 1-heptene and 1-octene, with 1-butene and 1-hexene being preferred.

In the present invention, hydrogen gas is used as chain transfer agent to regulate the melt index of the obtained polymer, and when the amount of hydrogen gas in the polymerization system is adjusted within the range of $H_2/C_2H_4$=0.1-2.5, a polyethylene product with a melt index $MI_{2.16}$ of from 0 to 200 g/10 minutes can be obtained.

The ethylene polymerization catalyst of the present invention has the following characteristics in comparison with the prior art.

(1) The polymerization kinetic behavior of the catalyst of the present invention can be readily controlled, and three different types of ethylene polymerization kinetic curves can be obtained by adjusting the temperature for thermally activating the support and the ratio of titanium to magnesium in the titanium-containing main catalyst component.

(2) The catalyst of the present invention has a balanced activity and is sensitive to hydrogen regulation.

(3) The catalyst of the present invention has a strong ability of copolymerization and can be used to produce polyethylene having a density of from 0.910 to 0.960 g/cm$^3$.

(4) The catalyst of the present invention has good particle morphology, and the obtained polymer product has a high bulk density and contains less fine powder.

MODE FOR CARRYING OUT THE INVENTION

The following examples are provided to further illustrate the present invention in detail, and are not to limit the scope of the invention in any way.

The performances of the polymers in the examples are measured by the following methods.

Melt index (MI): measured according to ASTM-D1238, Condition E, at 190° C.;

Polymer density: measured according to ASTM-1050;

Bulk density of polymer: measured according to ASTM-D 1895;

Polymer particle size distribution: measured by standard screens.

Example 1

Preparation of Catalyst (1) Preparation of the hydrocarbon solution of dibutylmagnesium compound $(C_4H_9)_2Mg \cdot yEt_3Al$ 6.12 g of a commercially available magnesium powder and 250 ml of heptane were charged into a 500 ml reaction flask, and were heated to the reflux temperature under stirring. Then 0.05 g of iodine and 1.0 ml of n-butyl chloride were added to the reaction flask, and the reaction was maintained for 1 hour. Then 19.5 g of n-butyl chloride was added dropwise by a constant pressure dropping funnel over 3 hours, and then the reaction was maintained for 2 hours. Next, 2.1 ml of triethylaluminum was added, and the reaction was maintained for further 2 hours. After the reaction was completed, the reaction system was cooled to about 50° C. and filtered under the protection of nitrogen gas, and the filter cake was washed with fresh heptane for several times. The obtained filtrate was concentrated by evaporating a portion of heptane, to give a heptane solution of $(C_4H_9)_2Mg \cdot 0.21Et_3Al$ having a magnesium content of 1.044 mol/L.

(2) Silica (Grace Davison 955) was heated to 600° C. under a fluidized state in a nitrogen gas flow, and held at this temperature for 10 hours, then the silica was gradually cooled to room temperature.

In a 250 ml reaction flask, 7.67 g of the thermally activated silica was slurried in 40 ml of hexane. 9 ml of the heptane solution of $(C_4H_9)_2Mg \cdot 0.21Et_3Al$ as prepared in step (1) was added thereto in one batch, and then the reaction was maintained at 35° C. for 3 hours.

(3) To the slurry formed in step (2) was added 4.68 g of 50 wt. % solution of 2-ethylhexanol in hexane via a constant pressure dropping funnel over 15 minutes. The reaction was maintained at 40° C. for 4 hours.

(4) To the slurry formed in step (3) were added 0.24 ml of diethylaluminum chloride and 3.4 g of n-butyl chloride, then the reaction was continued at 40° C. for 6 hours. At the end of the reaction, 1.05 g of titanium tetrachloride (Ti/Mg ratio=0.59) was added, and the reaction was warmed to 50° C. and held at that-temperature for 3 hours.

Then the reaction temperature was elevated to 70° C. to evaporate solvent, thereby obtaining a solid main catalyst component. The weight percent contents of the main elements in solid main catalyst component were found as: Mg: 1.82%, Ti: 2.10%, Al: 3.38%, Cl: 11.76%.

Polymerization Evaluation

Slurry polymerization evaluation was performed in a 2 L reactor. 1000 ml hexane solvent, an amount of solid main catalyst component and an amount of triethylaluminum were charged into the reactor with Al/Ti ratio being controlled at 200. After the temperature was elevated to 75° C., an amount of hydrogen gas necessary to provide a molar ratio of $H_2/C_2H_4$ of 0.2/0.8 for the low-hydrogen level condition and 0.7/0.3 for the high-hydrogen level condition was fed, and then ethylene was fed continuously to maintain a total pressure of 1.0 MPa. The temperature was further elevated to 85° C., and the reaction was maintained at this temperature for 2 hours. At the end of polymerization, the ethylene feed was stopped, and the reactor was quickly cooled and vented. The polymer slurry was recovered, and polyethylene powder was isolated from hexane. The polymerization conditions and results are shown in Table 1.

The particle size distribution of the polyethylene obtained by polymerization under low-hydrogen level condition is shown in Table 3.

Measurement of Kinetic Curve

Figure 1:
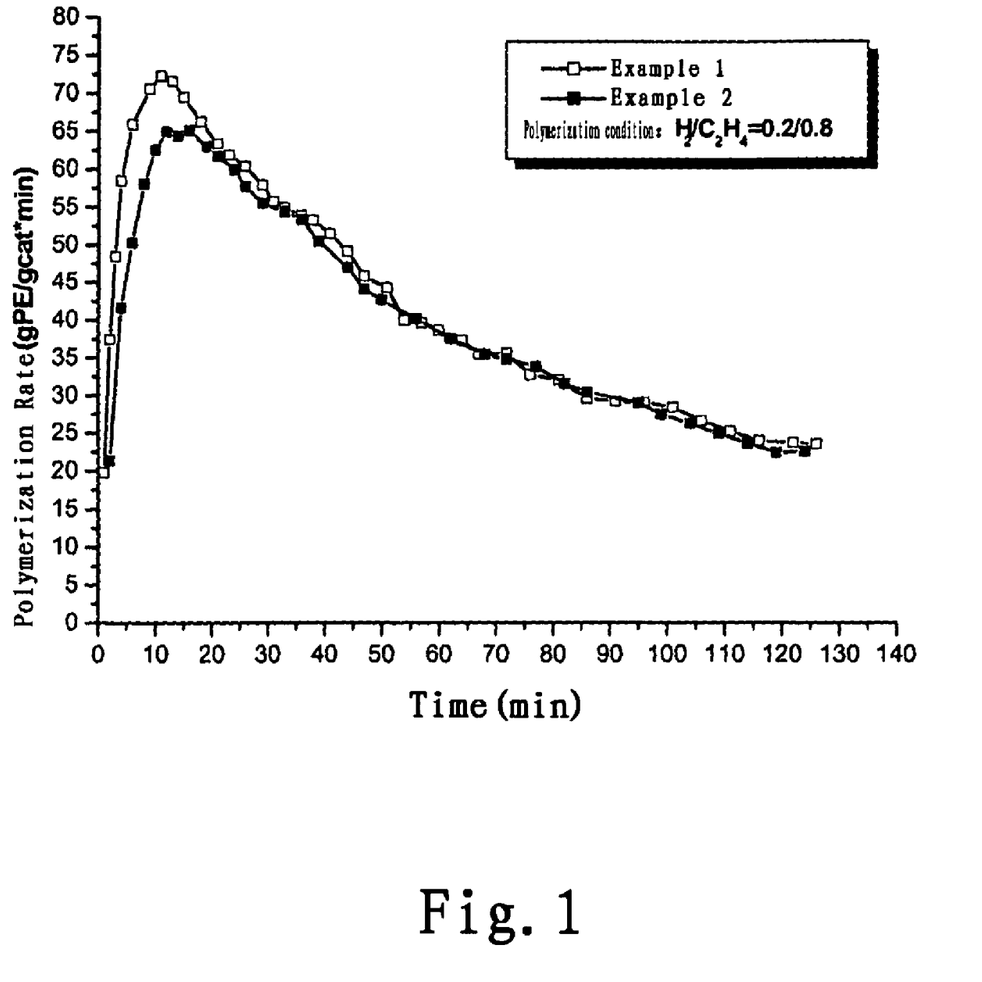
FIG. 1 shows the quickly rising and damping type kinetic curves of the catalysts of the Examples 1 and 2 of the present invention, obtained in the slurry polymerization under low-hydrogen level condition.

In the slurry polymerization evaluation, the instantaneous flow rate and cumulative flow rate of ethylene as a function of time during the polymerization process were recorded by a gas mass flow meter (MFM) equipped onto the ethylene pipe, so as to obtain the polymerization kinetic curve of this catalyst. This measurement was carried out under low-hydrogen level condition. The catalyst exhibits a quickly rising and damping type kinetic curve as shown in FIG. 1.

Example 2

Preparation of Catalyst (1) The heptane solution of dibutylmagnesium compound $(C_4H_9)_2Mg \cdot 0.21Et_3Al$ with a magnesium content of 1.044 mol/L as prepared in Example 1 was used.

(2) Silica (Grace Davison 955) was heated to 650° C. under a fluidized state in a nitrogen gas flow, and held at this temperature for 10 hours, then the silica was gradually cooled to room temperature.

In a 250 ml reaction flask, 7.14 g of the thermally activated silica was slurried in 40 ml of hexane. 8 ml of the heptane solution of $(C_4H_9)_2Mg \cdot 0.21Et_3Al$ as prepared in step (1) was added thereto in one batch, and then the reaction was maintained at 35° C. for 3 hours.

(3) To the slurry formed in step (2) was added 5.44 g of 50 wt. % solution of 2-ethylhexanol in hexane via a constant pressure dropping funnel over 40 minutes. The reaction was maintained at 40° C. for 4 hours.

(4) To the slurry formed in step (3) were added 0.22 ml of ethylaluminum dichloride and 3.10 g of n-butyl chloride, then the reaction was continued at 40° C. for 6 hours. At the end of the reaction, 1.109 g of titanium tetrachloride (Ti/Mg ratio=0.70) was added, and the reaction was warmed to 50° C. and held at that temperature for 3 hours.

Then the reaction temperature was elevated to 70° C. to evaporate solvent, thereby obtaining a solid main catalyst component. The weight percent contents of the main elements in solid main catalyst component were found as: Mg: 1.71%, Ti: 2.45%, Al: 3.99%, Cl: 12.37%.

Polymerization Evaluation

The slurry polymerization evaluation was performed in a 2 liters reactor, and followed the polymerization procedure as described in Example 1. The polymerization conditions and results are shown in Table 1.

Measurement of Kinetic Curve

The measurement followed the procedure as described in Example 1, and was carried out under low-hydrogen level condition. The catalyst exhibits a quickly rising and damping type kinetic curve as shown in FIG. 1.

Example 3

Preparation of Catalyst (1) Preparation of a hydrocarbon solution of dibutylmagnesium compound $(C_4H_9)_2Mg \cdot yEt_3Al$ The procedure as described in Example 1 was followed, except for that the amount of triethylaluminum was changed to 3.5 ml, thus a heptane solution of $(C_4H_9)_2Mg \cdot 0.344Et_3Al$ having a magnesium content of 1.016 mol/L was finally obtained.

(2) Silica (Grace Davison 955) was heated to 600° C. under a fluidized state in a nitrogen gas flow, and held at this temperature for 10 hours, then the silica was gradually cooled to room temperature.

In a 250 ml reaction flask, 7.0 g of the thermally activated silica was slurried in 40 ml of hexane. 18 ml of the heptane solution of $(C_4H_9)_2Mg \cdot 0.344Et_3Al$ as prepared in step (1) was added thereto in one batch, and then the reaction was maintained at 35° C. for 3 hours.

(3) To the slurry formed in step (2) was added 10.68 g of 50 wt. % solution of 2-ethylhexanol in hexane via a constant pressure dropping funnel over 40 minutes. The reaction was maintained at 40° C. for 4 hours.

(4) To the slurry formed in step (3) were added 0.36 ml of ethylaluminum dichloride and 6.78 g of n-butyl chloride, then the reaction was continued at 40° C. for 6 hours. At the end of the reaction, 0.96 g of titanium tetrachloride (Ti/Mg ratio=0.27) was added, and the reaction was warmed to 50° C. and held at that temperature for 3 hours.

Then the reaction temperature was elevated to 70° C. to evaporate solvent, thereby obtaining a solid main catalyst component. The weight percent contents of the main elements in solid main catalyst component were found as: Mg: 3.16%, Ti: 1.76%, Al: 4.26%, Cl: 13.63%.

Polymerization Evaluation

The slurry polymerization evaluation was performed in a 2 liters reactor, and followed the polymerization procedure as described in Example 1. The polymerization conditions and results are shown in Table 1.

The particle size distribution of the polyethylene obtained by polymerization under low-hydrogen level condition is shown in Table 3.

Measurement of Kinetic Curve

Figure 2:
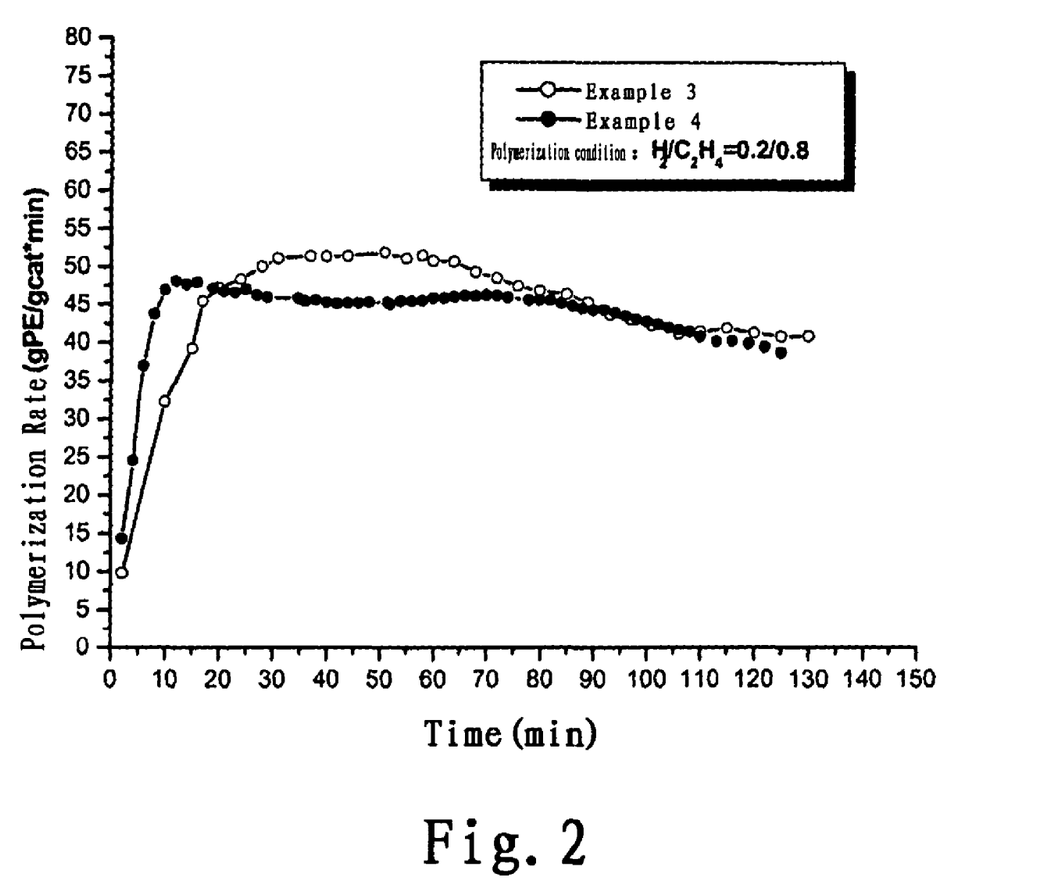
FIG. 2 shows the quickly rising and stable type kinetic curves of the catalysts of the Examples 3 and 4 of the present invention, obtained in the slurry polymerization under low-hydrogen level condition.

The measurement followed the procedure as described in Example 1, and was carried out under low-hydrogen level condition. The catalyst exhibits a quickly rising and stable type kinetic curve as shown in FIG. 2.

Example 4

Preparation of Catalyst (1) The heptane solution of dibutylmagnesium compound $(C_4H_9)_2Mg \cdot 0.344Et_3Al$ with a magnesium content of 1.016 mol/L as prepared in Example 3 was used.

(2) Silica (Grace Davison 955) was heated to 650° C. under a fluidized state in a nitrogen gas flow, and held at this temperature for 10 hours, then the silica was gradually cooled to room temperature.

In a 250 ml reaction flask, 7.05 g of the thermally activated silica was slurried in 40 ml of hexane. 19 ml of the heptane solution of $(C_4H_9)_2Mg.0.344Et_3Al$ as prepared in step (1) was added thereto in one batch, and then the reaction was maintained at 35° C. for 3 hours.

(3) To the slurry formed in step (2) was added 12.92 g of 50 wt. % solution of 2-ethylhexanol in hexane via a constant pressure dropping funnel over 40 minutes. The reaction was maintained at 40° C. for 4 hours.

(4) To the slurry formed in step (3) were added 1.1 ml of diethylaluminum chloride and 4.72 g of n-butyl chloride, then the reaction was continued at 40° C. for 6 hours. At the end of the reaction, 1.2862 g of titanium tetrachloride (Ti/Mg ratio=0.35) was added, and the reaction was warmed to 50° C. and held at that temperature for 3 hours.

Then the reaction temperature was elevated to 70° C. to evaporate solvent, thereby obtaining a solid main catalyst component. The weight percent contents of the main elements in solid main catalyst component were found as: Mg: 2.79%, Ti: 1.93%, Al: 3.75%, Cl: 14.86%.

Polymerization Evaluation

The slurry polymerization evaluation was performed in a 2 liters reactor, and followed the polymerization procedure as described in Example 1. The polymerization conditions and results are shown in Table 1.

Measurement of Kinetic Curve

The measurement followed the procedure as described in Example 1, and was carried out under low-hydrogen level condition. The catalyst exhibits a quickly rising and stable type kinetic curve as shown in FIG. 2.

Example 5

Preparation of Catalyst (1) The heptane solution of dibutylmagnesium compound $(C_4H_9)_2Mg.0.21Et_3Al$ with a magnesium content of 1.044 mol/L as prepared in Example 1 was used.

(2) Silica (Grace Davison 955) was heated to 500° C. under a fluidized state in a nitrogen gas flow, and held at this temperature for 10 hours, then the silica was gradually cooled to room temperature.

In a 250 ml reaction flask, 7.0 g of the thermally activated silica was slurried in 40 ml of hexane. 14 ml of the heptane solution of $(C_4H_9)_2Mg.0.21Et_3Al$ as prepared in step (1) was added thereto in one batch, and then the reaction was maintained at 35° C. for 3 hours.

(3) To the slurry formed in step (2) was added 11.18 g of 50 wt. % solution of 2-ethylhexanol in hexane via a constant pressure dropping funnel over 40 minutes. The reaction was maintained at 40° C. for 4 hours.

(4) To the slurry formed in step (3) were added 0.52 ml of ethylaluminum dichloride and 6.78 g of n-butyl chloride, then the reaction was continued at 40° C. for 6 hours. At the end of the reaction, 1.066 g of titanium tetrachloride (Ti/Mg ratio=0.38) was added, and the reaction was warmed to 50° C. and held at that temperature for 3 hours.

Then the reaction temperature was elevated to 70° C. to evaporate solvent, thereby obtaining a solid main catalyst component. The weight percent contents of the main elements in solid main catalyst component were found as: Mg: 2.64%, Ti: 2.15%, Al: 4.63%, Cl: 14.26%.

Polymerization Evaluation

The slurry polymerization evaluation was performed in a 2 liters reactor, and followed the polymerization procedure as described in Example 1. The polymerization conditions and results are shown in Table 1.

The particle size distribution of the polyethylene obtained by polymerization under low-hydrogen level condition is shown in Table 3.

Measurement of Kinetic Curve

Figure 3:
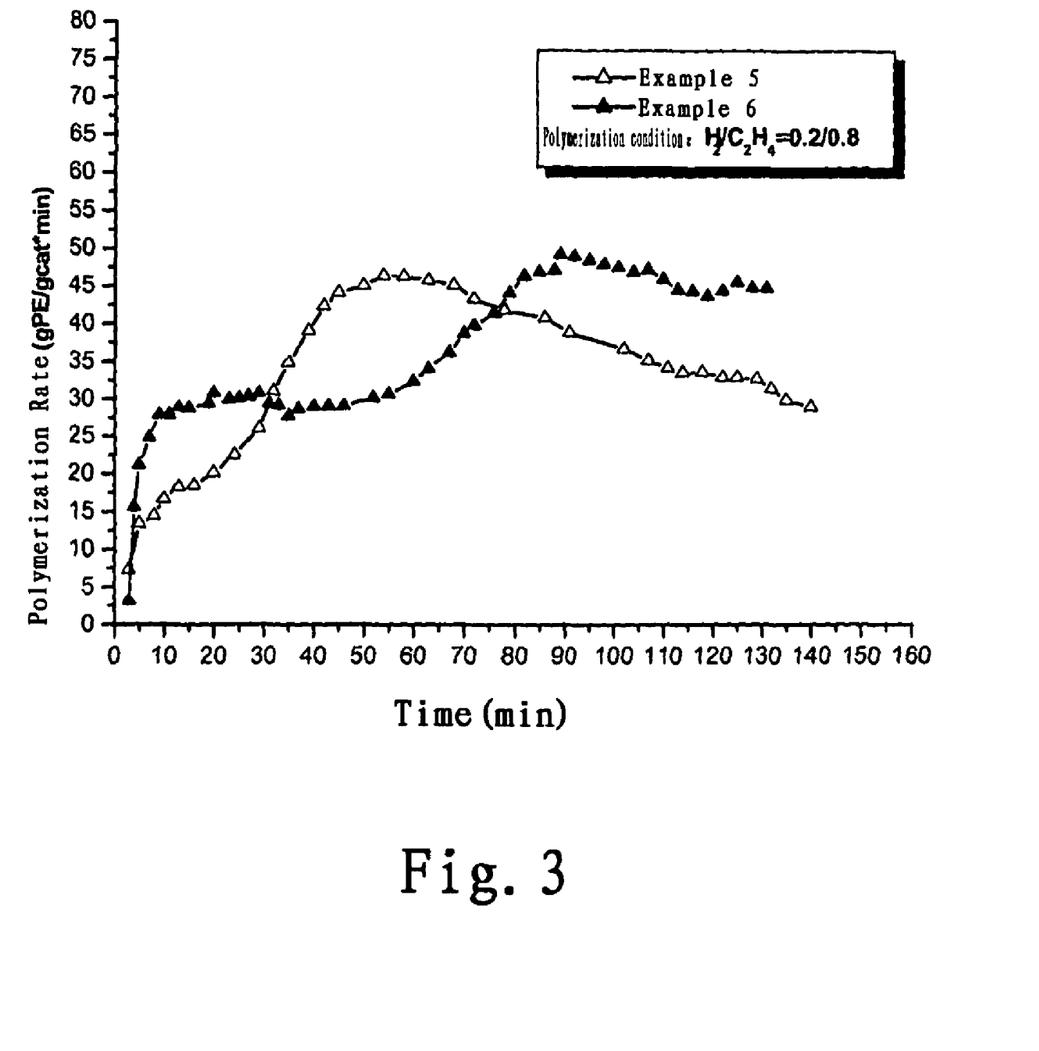
FIG. 3 shows the slowly rising and slowly falling type kinetic curves of the catalysts of the Examples 5 and 6 of the present invention, obtained in the slurry polymerization under low-hydrogen level condition.
Figure 4:
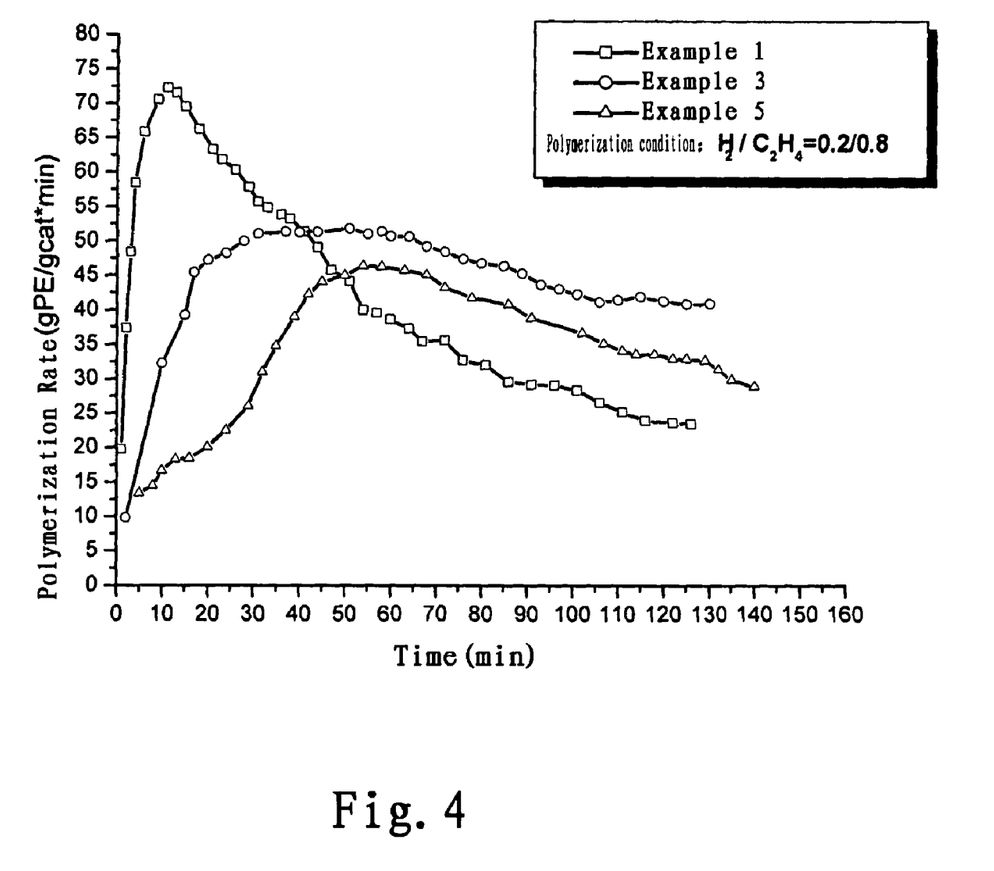
FIG. 4 shows the comparison of the kinetic curves of the catalysts of the Examples 1, 3 and 5 of the present invention, obtained in the slurry polymerization under low-hydrogen level condition.

The measurement followed the procedure as described in Example 1, and was carried out under low-hydrogen level condition. The catalyst exhibits a slowly rising and slowly falling type kinetic curve as shown in FIG. 3.

Example 6

Preparation of Catalyst (1) The heptane solution of dibutylmagnesium compound $(C_4H_9)_2Mg.0.21Et_3Al$ with a magnesium content of 1.044 mol/L as prepared in Example 1 was used.

(2) Silica (Grace Davison 955) was heated to 450° C. under a fluidized state in a nitrogen gas flow, and held at this temperature for 10 hours, then the silica was gradually cooled to room temperature.

In a 250 ml reaction flask, 7.03 g of the thermally activated silica was slurried in 40 ml of hexane. 12 ml of the heptane solution of $(C_4H_9)_2Mg.0.21Et_3Al$ as prepared in step (1) was added thereto in one batch, and then the reaction was maintained at 35° C. for 3 hours.

(3) To the slurry formed in step (2) was added 11.42 g of 50 wt. % solution of 2-ethylhexanol in hexane via a constant pressure dropping funnel over 40 minutes. The reaction was maintained at 40° C. for 4 hours.

(4) To the slurry formed in step (3) were added 0.72 ml of diethylaluminum chloride and 6.49 g of n-butyl chloride, then the reaction was continued at 40° C. for 6 hours. At the end of the reaction, 1.093 g of titanium tetrachloride (Ti/Mg ratio=0.46) was added, and the reaction was warmed to 50° C. and held at that temperature for 3 hours.

Then the reaction temperature was elevated to 70° C. to evaporate solvent, thereby obtaining a solid main catalyst component. The weight percent contents of the main elements in solid main catalyst component were found as: Mg: 2.47%, Ti: 2.28%, Al: 3.37%, Cl: 14.11%.

Polymerization Evaluation

The slurry polymerization evaluation was performed in a 2 liters reactor, and followed the polymerization procedure as described in Example 1. The polymerization conditions and results are shown in Table 1.

Measurement of Kinetic Curve

The measurement followed the procedure as described in Example 1, and was carried out under low-hydrogen level condition. The catalyst exhibits a slowly rising and slowly falling type kinetic curve as shown in FIG. 3.

Example 7

The polymerization reactions were carried out in a fluidized bed reactor having a diameter of 100 mm and a height of 1500 mm. In each run of the polymerization experiments, 100 g of an base of oven-dried particulate polyethylene was firstly added to the fluidized bed reactor, then co-catalyst, triethylaluminum, was added in an amount necessary to provide a molar ratio of Al/Ti of 150. After fluidized state was established, an amount of the main catalyst component as prepared according to Example 1 was added. With different compositions of polymerization gases, the polymerization was conducted at a total polymerization pressure of 1.2 MPa at 95° C. for 3 hours, to obtain white polyethylene. The results of the polymerization reaction are shown in Table 2.

TABLE 1

| Ex. No. | Low-hydrogen level $H_2/C_2H_4$ | High-hydrogen level $H_2/C_2H_4$ | Polymerization efficiency gPE/gcat. | Bulk density of polymer g/cm$^3$ | Melt index (MI$_{2.16}$) g/10 min |
|---|---|---|---|---|---|
| 1 | 0.2/0.8 | / | 5889 | 0.395 | 1.52 |
|   | /       | 0.7/0.3 | 2716 | 0.332 | 176.3 |
| 2 | 0.2/0.8 | / | 5410 | 0.387 | 1.17 |
|   | /       | 0.7/0.3 | 2618 | 0.342 | 169.4 |
| 3 | 0.2/0.8 | / | 6045 | 0.369 | 2.11 |
|   | /       | 0.7/0.3 | 2573 | 0.320 | 180.4 |
| 4 | 0.2/0.8 | / | 5739 | 0.371 | 1.74 |
|   | /       | 0.7/0.3 | 2629 | 0.331 | 185.6 |
| 5 | 0.2/0.8 | / | 5276 | 0.372 | 1.37 |
|   | /       | 0.7/0.3 | 2412 | 0.316 | 169.4 |
| 6 | 0.2/0.8 | / | 5643 | 0.366 | 1.63 |
|   | /       | 0.7/0.3 | 2581 | 0.321 | 179.2 |

TABLE 2

| | Composition of feed gases | | | Polymerization efficiency gPE/gcat. | Density of polymer g/cm$^3$ | Bulk density of polymer g/cm$^3$ | MI$_{2.16}$ g/10 min |
|---|---|---|---|---|---|---|---|
| Entry | $H_2/C_2H_4$ | $C_4H_8/C_2H_4$ | Partial pressure of ethylene (MPa) | | | | |
| 1 | 0.21 | 0.41 | 0.75 | 8661 | 0.914 | 0.313 | 1.68 |
| 2 | 0.19 | 0.30 | 0.80 | 10321 | 0.932 | 0.364 | 1.39 |
| 3 | 0.24 | 0.22 | 0.83 | 9039 | 0.942 | 0.379 | 1.31 |
| 4 | 0.22 | 0.15 | 0.90 | 8939 | 0.951 | 0.390 | 1.14 |

TABLE 3

| | Particles size distribution of polymer obtained under low-hydrogen level condition (wt %) | | | | | |
|---|---|---|---|---|---|---|
| Ex. No. | <20 mesh | 20-40 mesh | 40-75 mesh | 75-120 mesh | 120-200 mesh | >200 mesh |
| 1 | 1.0 | 74.3 | 20.5 | 2.9 | 1.1 | 0.2 |
| 3 | 1.9 | 67.5 | 26.5 | 2.5 | 1.2 | 0.4 |
| 5 | 1.1 | 71.9 | 22.6 | 2.9 | 1.4 | 0.1 |

What is claimed is:

1. A catalyst for the polymerization of ethylene, consisting of component A and component B, wherein the component A is the main catalyst component and is prepared by contacting and reacting the following components:
   (1) a hydrocarbon solution of dialkylmagnesium compound, wherein the dialkylmagnesium compound is represented by a formula of RMgR'.yEt$_3$Al, wherein R and R' are identical or different, and are alkyl group having from 4 to 8 carbon atoms, y represents the molar ratio of Et$_3$Al to RMgR' and has a value of from 0.125 to 0.5;
   (2) an alcohol compound of formula R$^1$OH, wherein R$^1$ is an alkyl group having from 2 to 10 carbon atoms;
   (3) a silica support thermally activated at a temperature of from 200 to 800° C.;
   (4) an alkylaluminum compound of formula R$^2{}_n$AlCl$_{3-n}$, wherein R$^2$ is an alkyl having from 1 to 14 carbon atoms, and n is a number of from 1 to 3;
   (5) a linear halogenated alkane of formula R$^3$X, wherein R$^3$ is a linear alkyl group having from 3 to 12 carbon atoms, and X is halogen; and
   (6) a titanium compound of formula Ti(OR$^4$)$_m$Cl$_{4-m}$, wherein R$^4$ is an alkyl group having from 1 to 10 carbon atoms, and m is a number of from 0 to 4;
   and wherein the component B is co-catalyst, and is an organoaluminum compound.

2. The catalyst according to claim 1, wherein the molar ratio of said component B and said component A, expressed as molar ratio of Al in the component B to Ti in the component A, is in a range of from 30:1 to 300:1.

3. The catalyst according to claim 1, wherein the titanium compound is used in such an amount that the molar ratio of the titanium in compound Ti(OR$^4$)$_m$Cl$_{4-m}$ to the Mg in the dialkylmagnesium compound is in a range of from 0.2:1 to 1:1.

4. The catalyst according to claim 1, wherein the silica support is thermally activated at a temperature of from 400 to 500° C., and the molar ratio of Ti in the titanium compound Ti(OR$^4$)$_m$Cl$_{4-m}$ to the Mg in the dialkylmagnesium compound is in a range of from 0.28:1 to 0.50:1.

5. The catalyst according to claim 1, wherein the silica support is thermally activated at a temperature of from 550 to 700° C., and the molar ratio of Ti in the titanium compound Ti(OR$^4$)$_m$Cl$_{4-m}$ to the Mg in the dialkylmagnesium compound is in a range of from 0.26:1 to 0.40:1.

6. The catalyst according to claim 1, wherein the silica support is thermally activated at a temperature of from 550 to 700° C., and the molar ratio of Ti in the titanium compound Ti(OR$^4$)$_m$Cl$_{4-m}$ to the Mg in the dialkylmagnesium compound is in a range of from 0.53:1 to 0.78:1.

7. The catalyst according to claim 1, wherein the dialkylmagnesium compound is any one selected from the group consisting of dibutylmagnesium, dihexylmagnesium, butylhexylmagnesium, and butyloctylmagnesium.

8. The catalyst according to claim 1, wherein the alcohol compound is any one selected from the group consisting of isobutanol, 2-ethylhexanol, 2-methylpentanol, 2-ethylbutanol, and octanol.

9. The catalyst according to claim 1, wherein the alkylaluminum used in the component A is selected from the group consisting of triethylaluminum, triisopropylaluminum, triisobutylaluminum, tri(n-octyl)aluminum, tri(2-ethylhexyl) aluminum, diethylaluminum chloride, ethylaluminum dichloride, diisopropylaluminum chloride, ethylaluminum sesquichloride, butylaluminum sesquichloride, and mixtures thereof.

10. The catalyst according to claim 1, wherein the X is chlorine.

11. The catalyst according to claim 1, wherein the linear halogenated alkane is selected from the group consisting of n-butyl chloride, n-pentyl chloride, n-hexyl chloride, n-heptyl chloride, n-octyl chloride, and mixtures thereof.

12. The catalyst according to claim 1, wherein the titanium compound is selected from the group consisting of titanium tetrachloride, tetra-n-butyl titanate, tetra-iso-propyl titanate, methoxytitanium trichloride, butoxytitanium trichloride, dibutoxytitanium dichloride, tributoxytitanium chloride, and mixtures thereof.

13. A main catalyst component, which is prepared by contacting and reacting the following components:
   (1) a hydrocarbon solution of dialkylmagnesium compound, wherein the dialkylmagnesium compound is represented by a formula of RMgRe'.yEt$_3$Al, wherein R and R' are identical or different, and are alkyl group having from 4 to 8 carbon atoms, y represents the molar ratio of Et$_3$Al to RMgR' and has a value of from 0.125 to 0.5;
   (2) an alcohol compound of formula R$^1$OH, wherein R$^1$ is an alkyl group having from 2 to 10 carbon atoms;
   (3) a silica support thermally activated at a temperature of from 200 to 800° C.;
   (4) an alkylaluminum compound of formula R$^2_n$AlCl$_{3-n}$, wherein R$^2$ is an alkyl having from 1 to 14 carbon atoms, and n is a number of from 1 to 3;
   (5) a linear halogenated alkane of formula R$^3$X, wherein R$^3$ is a linear alkyl group having from 3 to 12 carbon atoms, and X is halogen; and
   (6) a titanium compound of formula Ti(OR$^4$)$_m$Cl$_{4-m}$, wherein R$^4$ is an alkyl group having from 1 to 10 carbon atoms, and m is a number of from 0 to 4.

14. A process for preparing a catalyst for polymerization of ethylene, comprising the steps of:
   (1) impregnating a silica support thermally activated at a temperature of from 200 to 800° C. with a hydrocarbon solution of dialkylmagnesium compound RMgR'.yEt$_3$Al, wherein R and R' are identical or different alkyl group having from 4 to 8 carbon atoms, and y is the molar ratio of Et$_3$Al to RMgR' and has a value between 0.125 and 0.5, to form a slurry, wherein said dialkylmagnesium compound is used in an amount of from 0.5 to 5.0 mmolMg/gSiO$_2$;
   (2) adding an alcohol compound R$^1$OH, wherein R$^1$ is an alkyl group having from 2 to 10 carbon atoms, into the slurry obtained in step (1), and allowing them to react, wherein said alcohol compound is used in such an amount that the molar ratio of R$^1$OH to the Mg in the dialkylmagnesium compound is in a range of from 1.7:1 to 4.0:1;
   (3) adding alkylaluminum compound of formula R$^2_n$AlCl$_{3-n}$, wherein R$^2$ is an alkyl group having from 1 to 14 carbon atoms, and n is a number of from 1 to 3, and a linear halogenated alkane of formula R$^3$X, wherein R$^3$ is a linear alkyl group having from 3 to 12 carbon atoms, and X is halogen, into the slurry obtained in step (2), and allowing them to react, wherein the alkylaluminum compound is used in such an amount that the molar ratio of the Al in compound R$^2_n$AlCl$_{3-n}$ to Mg in the dialkylmagnesium compound is in a range of from 0.1:1 to 0.5:1, and the linear halogenated alkane R$^3$X is used in such an amount that the molar ratio of compound R$^3$X to the Mg in the dialkylmagnesium compound is in a range of from 1.8:1 to 6.0:1;
   (4) adding a titanium compound of formula Ti(OR$^4$)$_m$Cl$_{4-m}$, wherein R$^4$ is an alkyl group having from 1 to 10 carbon atoms, and m is a number of from 0 to 4, into the slurry formed in step (3), allowing them to react, and then drying to give a solid main catalyst component, wherein the titanium compound is used in such an amount that the molar ratio of the titanium in compound Ti(OR$^4$)$_m$Cl$_{4-m}$ to the Mg in the dialkylmagnesium compound is in a range of from 0.2:1 to 1:1; and
   (5) contacting the main catalyst component with a co-catalyst to form a catalyst for ethylene polymerization, wherein the co-catalyst is an organoaluminum compound.

15. The process according to claim 14, wherein the molar ratio of said co-catalyst, calculated on Al basis, to said main catalyst component, calculated on Ti basis, is in a range of from 30:1 to 300:1.

16. The process according to claim 14, wherein the silica support is activated at a temperature of from 400 to 700° C.

17. The process according to claim 14, wherein the titanium compound is used in such an amount that the molar ratio of the titanium in compound Ti(OR$^4$)$_m$Cl$_{4-m}$ to the Mg in the dialkylmagnesium compound is in a range of from 0.25:1 to 0.90:1.

18. A process for preparing a main catalyst component for polymerization of ethylene, comprising the steps of:
   (1) impregnating a silica support thermally activated at a temperature of from 200 to 800° C. with a hydrocarbon solution of dialkylmagnesium compound RMgR'.yEt$_3$Al, wherein R and R' are identical or different alkyl group having from 4 to 8 carbon atoms, and y is the molar ratio of Et$_3$Al to RMgR' and has a value between 0.125 and 0.5, to form a slurry, wherein said dialkylmagnesium compound is used in an amount of from 0.5 to 5.0 mmolMg/gSiO$_2$;
   (2) adding an alcohol compound R$^1$OH, wherein R$^1$ is an alkyl group having from 2 to 10 carbon atoms, into the slurry obtained in step (1), and allowing them to react, wherein said alcohol compound is used in such an amount that the molar ratio of R$^1$OH to the Mg in the dialkylmagnesium compound is in a range of from 1.7:1 to 4.0:1;
   (3) adding alkylaluminum compound of formula R$^2_n$AlCl$_{3-n}$, wherein R$^2$ is an alkyl group having from 1 to 14 carbon atoms, and n is a number of from 1 to 3, and a linear halogenated alkane of formula R$^3$X, wherein R$^3$ is a linear alkyl group having from 3 to 12 carbon atoms, and X is halogen, into the slurry obtained in step (2), and allowing them to react, wherein the alkylaluminum compound is used in such an amount that the molar ratio of the Al in compound R$^2_n$AlCl$_{3-n}$ to Mg in the dialkylmagnesium compound is in a range of from 0.1:1 to 0.5:1, and the linear halogenated alkane R$^3$X is used in such an amount that the molar ratio of compound R$^3$X to the Mg in the dialkylmagnesium compound is in a range of from 1.8:1 to 6.0:1; and
   (4) adding a titanium compound of formula Ti(OR$^4$)$_m$Cl$_{4-m}$, wherein R$^4$ is an alkyl group having from 1 to 10 carbon atoms, and m is a number of from 0 to 4, into the slurry formed in step (3), allowing them to react, and then drying to give a solid main catalyst component, wherein the titanium compound is used in such an amount that the molar ratio of the titanium in compound Ti(OR$^4$)$_m$Cl$_{4-m}$ to the Mg in the dialkylmagnesium compound is in a range of from 0.2:1 to 1:1.

19. A method for controlling kinetic behavior of the catalyst according to claim 1 in ethylene polymerization by adjusting temperature for thermally activating the silica support and molar ratio of the titanium compound to the magnesium compound in the titanium containing main catalyst component, wherein the temperature for thermally activating silica is in a range of from 200 to 800° C., and the molar ratio of the Ti in the titanium compound $Ti(OR^4)_mCl_{4-m}$ to the Mg in the dialkylmagnesium compound is in a range of from 0.2:1 to 1:1.

20. The method according to claim 19, wherein when silica is thermally activated at a temperature of from 550-700° C., and the molar ratio of the Ti in the titanium compound to the Mg in the dialkylmagnesium compound in the main catalyst component is in a range of from 0.53:1 to 0.78:1, the kinetic behavior of the catalyst in ethylene polymerization is expressed as a quickly rising and damping type of kinetic curve;

when silica is thermally activated at a temperature of from 550-700° C., and the molar ratio of the Ti in the titanium compound to the Mg in the dialkylmagnesium compound in the main catalyst component is in a range of from 0.26:1 to 0.40:1, the kinetic behavior of the catalyst in ethylene polymerization is expressed as a quickly rising and stable type of kinetic curve; and when silica is thermally activated at a temperature of from 400-500° C., and the molar ratio of the Ti in the titanium compound to the Mg in the dialkylmagnesium compound in the main catalyst component is in a range of from 0.28:1 to 0.50:1, the kinetic behavior of the catalyst in ethylene polymerization is expressed as a slowly rising and slowly falling type of kinetic curve.

\* \* \* \* \*